(12) United States Patent
Hoffjann et al.

(10) Patent No.: US 10,516,175 B2
(45) Date of Patent: Dec. 24, 2019

(54) FUEL CELL SYSTEM, A FIRE FIGHTING SYSTEM, AND AN AIRCRAFT

(71) Applicant: Airbus Operations GmbH, Hamburg (DE)

(72) Inventors: Claus Hoffjann, Hamburg (DE); Guido Klewer, Hamburg (DE); Hauke-Peer Lüdders, Hamburg (DE); Sijmen Zandstra, Hamburg (DE)

(73) Assignee: Airbus Operations GmbH (DE)

( * ) Notice: Subject to any disclaimer, the term of this patent is extended or adjusted under 35 U.S.C. 154(b) by 199 days.

(21) Appl. No.: 15/838,881

(22) Filed: Dec. 12, 2017

(65) Prior Publication Data
US 2018/0102557 A1   Apr. 12, 2018

Related U.S. Application Data

(63) Continuation of application No. 14/831,190, filed on Aug. 20, 2015, now Pat. No. 9,882,227.

(30) Foreign Application Priority Data

Aug. 26, 2014   (EP) .................................... 14182230

(51) Int. Cl.
*H01M 8/04*      (2016.01)
*H01M 8/04119*   (2016.01)
(Continued)

(52) U.S. Cl.
CPC ... *H01M 8/04156* (2013.01); *H01M 8/04007* (2013.01); *H01M 8/04097* (2013.01);
(Continued)

(58) Field of Classification Search
CPC ....................................................... H01M 8/04
See application file for complete search history.

(56) References Cited

U.S. PATENT DOCUMENTS 7,799,477 B2   9/2010   Metzler et al.
8,925,865 B2   1/2015   Stolte et al.
(Continued)

FOREIGN PATENT DOCUMENTS

DE   10 2005 010 399 A1   9/2006
DE   10 2012 002 131 A1   8/2013
(Continued)

OTHER PUBLICATIONS

EP Search Report dated Feb. 18, 2015.

*Primary Examiner* — Jacob B Marks
(74) *Attorney, Agent, or Firm* — Lerner, David, Littenberg, Krumholz & Mentlik, LLP

(57) ABSTRACT

A fuel cell system for an aircraft includes a fuel cell, wherein at the cathode side a cathode inlet and a cathode outlet is provided, and wherein at the anode side an anode inlet and an anode outlet is provided, and a cathode recirculation channel for passing the cathode product fluid from the cathode outlet to the cathode inlet. In the fuel cell system, the water content of the cathode product fluid in the cathode recirculation channel can be reduced or at least stabilized in a possibly effective way, because the cathode recirculation channel includes a water extraction device for extracting water from the cathode product fluid.

11 Claims, 1 Drawing Sheet

(51) Int. Cl.
*H01M 8/04089* (2016.01)
*H01M 8/04082* (2016.01)
*H01M 8/04007* (2016.01)
*H01M 8/04111* (2016.01)
*A62C 3/08* (2006.01)
*H01M 8/04014* (2016.01)

(52) U.S. Cl.
CPC .... *H01M 8/04111* (2013.01); *H01M 8/04201* (2013.01); *A62C 3/08* (2013.01); *H01M 8/04014* (2013.01); *H01M 2250/20* (2013.01); *Y02T 90/32* (2013.01)

(56) References Cited

U.S. PATENT DOCUMENTS

| | | | |
|---|---|---|---|
| 9,028,990 B2 | 5/2015 | Gans et al. | |
| 2007/0026268 A1* | 2/2007 | Metzler | H01M 8/04029 244/53 R |
| 2007/0172707 A1 | 7/2007 | Hoffjann et al. | |

FOREIGN PATENT DOCUMENTS

| | | |
|---|---|---|
| EP | 1 702 842 A1 | 9/2006 |
| EP | 1902954 A2 | 3/2008 |
| EP | 2 712 013 A1 | 3/2014 |

* cited by examiner

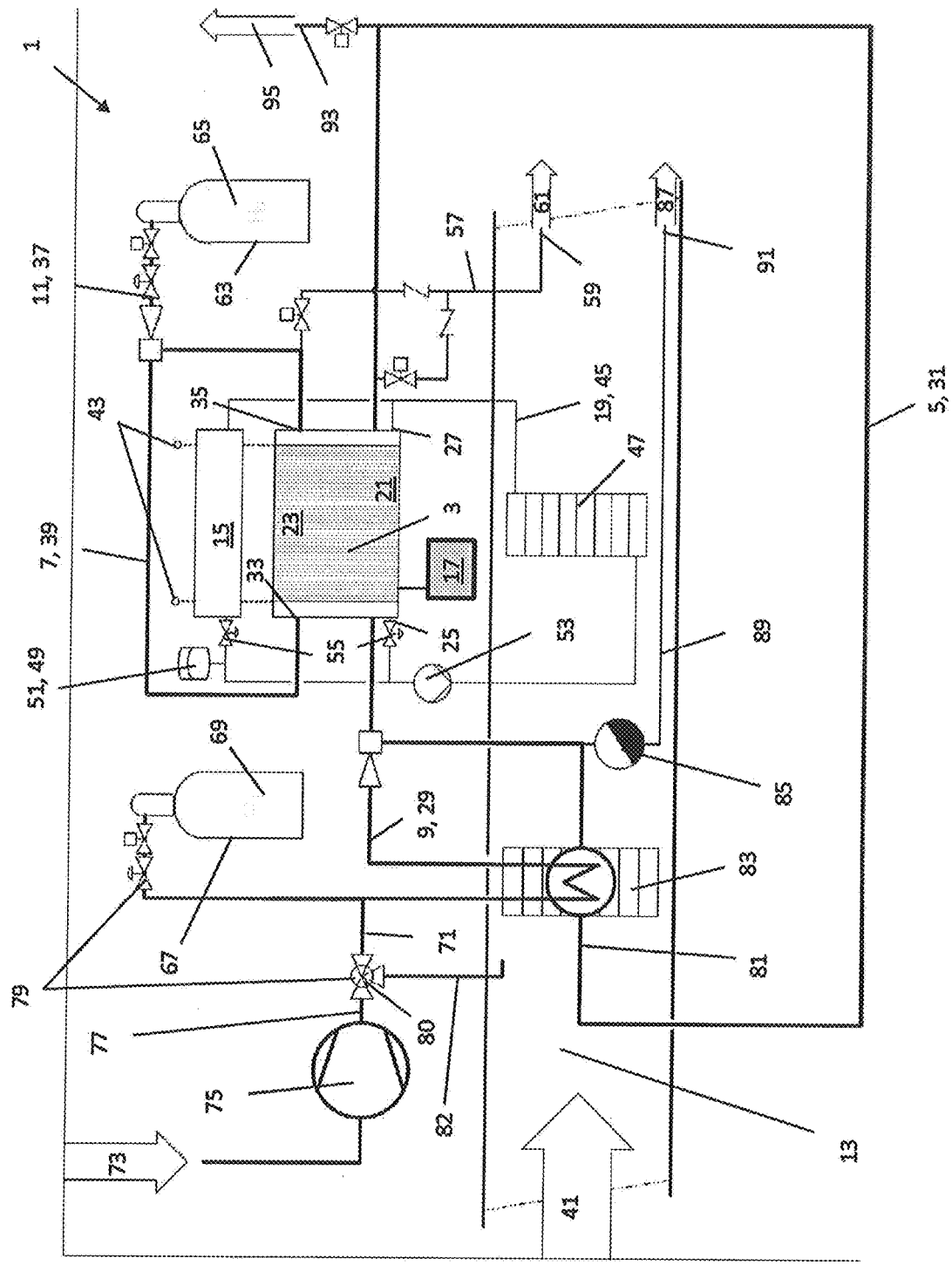

FUEL CELL SYSTEM, A FIRE FIGHTING SYSTEM, AND AN AIRCRAFT

CROSS-REFERENCE TO RELATED APPLICATIONS

The present application is a continuation of U.S. patent application Ser. No. 14/831,190, filed on Aug. 20, 2015, which claims priority from European Patent Application No. 14182230.4 filed Aug. 26, 2014, all of which are incorporated herein by reference.

FIELD OF THE INVENTION

The present invention relates to a fuel cell system for an aircraft. Further aspects of the present invention relate to a fire fighting system for an aircraft, and to an aircraft comprising such a fuel cell system or such a fire fighting system. The fuel cell system might be formed as an emergency power supply for an aircraft supplying electrical power to the aircraft in the case of an emergency, e.g. an engine failure. Additionally or alternatively, the fuel cell system might be formed as an oxygen depleted air supply device for a fire fighting system of an aircraft supplying oxygen depleted air as a fire suppression media to a fire fighting system.

BACKGROUND OF THE INVENTION

The fuel cell system comprises at least one fuel cell, preferably a stack of multiple fuel cells, and a cathode recirculation channel. The fuel cell has a cathode side and an anode side. At the cathode side a cathode inlet for supplying an oxidant fluid to the fuel cell and a cathode outlet for discharging a cathode product fluid from the fuel cell is provided. The oxidant fluid may preferably be an oxygenic gas, such as air, or pure oxygen. The cathode product fluid represents the reaction product of the chemical reaction in the fuel cell at the cathode side and is usually a gas. At the anode side an anode inlet for supplying a fuel fluid to the fuel cell and an anode outlet for discharging an anode product fluid from the fuel cell is provided. The fuel fluid may preferably be a hydrogenous gas or pure hydrogen. The anode product fluid represents the reaction product of the chemical reaction in the fuel cell at the anode side and is usually a gas. The cathode recirculation channel connects the cathode outlet to the cathode inlet for passing the cathode product fluid from the cathode outlet to the cathode inlet to be used as an oxidant fluid fed into the fuel cell.

Such fuel cell systems are known in the prior art. DE 10 2005 010 399 A1 describes a fuel cell system as an emergency power supply comprising a stack of fuel cells connected to an oxidant supply and a hydrogen supply, a pump, and a converter unit. DE 10 2012 002 131 A1 discloses an emergency supply system comprising a fuel cell system and a fire fighting system, the fuel cell system comprises a fuel cell, an oxygen supply and a hydrogen supply for supplying oxygen and hydrogen to the fuel cell. Further, the fuel cell has an outlet for discharging a product gas from the fuel cell. The outlet is connected to the fire fighting system for passing oxygen depleted air as a product from the chemical reaction in the fuel cell from the outlet of the fuel cell to the fire fighting system in order to be used as a fire suppression media. From the fire fighting system the remaining oxygen depleted air is recirculated through a recirculation channel and fed into an inlet of the fuel cell.

However, when the product fluid with the oxygen depleted air is recirculated and fed into the fuel cell again as a reactant, and this recirculation process is repeated several times, the water content in the product fluid increases continuously which decreases efficiency of the fuel cell system and eventually may block the entire fuel cell system.

BRIEF SUMMARY OF THE INVENTION

Therefore, an aspect of the present invention may provide a fuel cell system for an aircraft, wherein the water content of the cathode product fluid in the cathode recirculation channel can be reduced or at least stabilized in a possibly effective way.

The cathode recirculation channel comprises a water extraction device for extracting water from the cathode product fluid. In such a manner water from the cathode product fluid flowing in the cathode recirculation channel can effectively be extracted by the water extraction device in order to reduce or stabilize the water content in the cathode product fluid.

In a preferred embodiment the cathode recirculation channel comprises a cooling section. The cooling section comprises a cooler device for cooling the cathode product fluid in the cathode recirculation channel. The water extraction device is provided in the cooling section, preferably downstream from the cooler device. The cooler device may be any kind of cooler device, such as an air cooler device or a liquid cooler device, and together with the water extraction device may be formed as a condenser.

In an exemplary embodiment, the fuel cell system comprises a ram air channel for receiving a flow of ram air from the ambience. The cooling section extends through the ram air channel. The cooler device is formed as an air cooler device for cooling the cathode product fluid in the cathode recirculation channel by the ram air streaming through the ram air channel.

The ram air channel can be provided in the belly fairing section of the fuselage of a respective aircraft. The ram air channel can have an opening to the front of the aircraft, i.e. in the direction of flight, so that during flight of the aircraft the non-decelerated ambient air flows into the opening and impinges on the cooler device. The cooler device and the water extraction device can be formed together as a condenser.

In such a manner water from the cathode product fluid flowing in the cathode recirculation channel can effectively be extracted by the cooler device and the water extraction device in order to reduce or stabilize the water content in the cathode product fluid. The process of cooling and extracting water from the cathode product fluid can be performed very fast and reliable, as the ram air represents a very effective coolant media. By reducing or stabilizing the water content in the cathode product fluid operation of the entire fuel cell system can be improved with respect to efficiency.

As an alternative to the ram air channel and to cooling the cooler device by ram air flowing through the ram air channel, the cooling section may comprise a cabin air cooling device, wherein cabin air can be blown through the cooler device by means of a fan in order to transfer heat between the cabin air and the oxidant fluid or cathode recirculation fluid in the cooler device. As a further alternative to the ram air channel, it is possible that the cooling section comprises a different cooler device, such as e.g. a liquid cooler device which is connected to the cooling system of the fuel cell system and which cools the oxidant fluid or the cathode recirculation fluid in the cooler device by the coolant fluid in the cooling system.

In a preferred embodiment an oxidant supply channel is connected to the cathode recirculation channel for introducing oxidant fluid into the cathode recirculation channel. In such a way fresh oxidant fluid which has not yet been inside the fuel cell or the cathode recirculation channel can be introduced in order to keep the operation of the fuel cell ongoing.

In an exemplary embodiment, the oxidant supply channel is connected to an oxygen reservoir storing oxygen. The oxygen reservoir might be a bottle storing the oxygen preferably in a compressed and pure form. The oxygen reservoir can be kept onboard of a respective aircraft and can provide oxygen to the fuel cell at any time, in particular when oxygen supply through other sources, e.g. air supply, is inhibited, as it might be during an emergency such as an engine failure.

Alternatively or additionally, the oxidant supply channel is connected to an air supply device for supplying air, preferably compressed air, to the oxidant supply channel. The air can be supplied by different sources and preferably in a compressed state. Supplying air to the fuel cell as an oxidant fluid is preferred until an air supply is inhibited, e.g. due to an emergency such as an engine failure. No stored oxygen needs to be consumed as long as air can be provided.

In another exemplary embodiment, the air supply device comprises a compressor for providing compressed air to the oxidant supply channel. Providing compressed air through a compressor becomes necessary at least during flight of the respective aircraft in high altitudes where the air pressure of the ambient air is undesirable low for use in a fuel cell. Different kinds of compressors can be provided or used, such as the compressor of one or more of the jet engines of the associated aircraft, the compressor of the Auxiliary Power Unit (APU) of the associated aircraft, the compressor responsible for cabin air pressure, or one or more separate compressors provided for other reasons.

In yet another exemplary embodiment, the air supply device comprises a jet engine of the respective aircraft including the compressor or at least a compressor stage, and a bleed air extraction device for extracting the compressed air in the form of bleed air from the compressor or the compressor stage. Extracting bleed air from the engine of the associated aircraft represents an easy way of providing compressed air as an oxidant fluid for the fuel cell. However, it can only be extracted as long as the engine runs. In particular, it is preferred that the air supply device comprises a central bleed air system which is connected to multiple jet engines, preferably to all jet engines, of the respective aircraft for extracting bleed air from the compressors of each jet engine. By such a central bleed air system bleed air can be provided to the oxidant supply channel, and thus to the fuel cell, in a redundant manner, i.e. in a reliably manner even in the event that one engine fails.

Alternatively, the air supply device comprises a cabin air extraction device for extracting compressed air in the form of cabin air from the cabin compartment of an associated aircraft. In the case that a supplementary compressor, e.g. an electrical driven compressor, is provided for establishing the cabin air pressure, compressed cabin air can be extracted and provided to the fuel cell even in the event that the aircraft engine fails.

According to a preferred embodiment at least one oxidant supply valve is provided for selecting oxidant supply either from the oxygen reservoir or from the air supply device. The oxidant supply valve can be provided in the oxidant supply channel or between the oxidant supply channel and the oxygen reservoir and/or the air supply device. By such an oxidant supply valve it can be selected whether oxygen from the oxygen reservoir or air from the air supply device is passed to the fuel cell.

According to a further embodiment the oxidant supply channel extends through the cooler device, i.e. is operationally connected to the cooler device, so that heat can be exchanged between the oxidant fluid in the oxidant supply channel, and the cathode product fluid in the cathode recirculation channel. For example, heat can be exchanged between a cold, expanded oxygen fluid after being released from an oxygen reservoir, and a warmer cathode product fluid.

Preferably, the cooler device is formed as a 3-way heat exchanger providing that heat can be exchanged between the oxidant fluid in the oxidant supply channel, the cathode product fluid in the cathode recirculation channel, and the ram air in the ram air channel. In such a way both the cathode product fluid and the oxidant fluid can be cooled or heated, as desired, before being introduced into the fuel cell. The cathode product fluid usually needs to be cooled in order to extract water, just as the compressed air when used as oxidant fluid. Cooling of the cathode product fluid can be carried out by oxygen from the oxygen reservoir, wherein the temperature of the oxygen decreases during expanding of the compressed oxygen ("Joule-Thomson-Effect"), or by ram air when air is supplied as oxidant fluid instead of oxygen from the oxygen reservoir. The compressed air from the air supply device can be cooled by the ram air flowing through the ram air channel.

In an exemplary embodiment, a control unit is provided which is configured to operate the fuel cell system in a first operational mode and in a second operational mode. In the first operational mode the oxidant fluid is supplied to the cathode recirculation channel in the form of oxygen by the oxygen reservoir. Said oxygen from the oxygen reservoir is passed through the cooler device in order to cool, i.e. at the same time receive heat from, the cathode product fluid in the cathode recirculation device. In the second operational mode oxidant fluid is supplied to the cathode recirculation channel in the form of air by the air supply device. Said air from the air supply device is passed through the cooler device in order to be cooled by, i.e. at the same time transfer heat to, the ram air in the ram air channel and the cathode product fluid in the cathode recirculation channel. Said cathode product fluid in turn is cooled by the ram air in the ram air channel, as well. Accordingly, the control unit can control which oxidant fluid, i.e. oxygen or air, is supplied to the fuel cell and in which way the cathode product fluid as well as the compressed air are cooled. As described above, as alternatives to the ram air channel and cooling via ram air the cooling section may also employ a cabin air cooler device or a liquid cooler device for cooling.

In a preferred embodiment an anode recirculation channel is provided which connects the anode outlet to the anode inlet for passing the anode product fluid from the anode outlet to the anode inlet, where it is used as fuel fluid. In particular a fuel supply channel is connected to the anode recirculation channel for introducing fuel fluid into the anode recirculation channel. The fuel supply channel is connected to a hydrogen reservoir which stores hydrogen. The hydrogen reservoir is preferably formed as a bottle which stores hydrogen in a compressed and pure form. In such a manner the anode product fluid can be recirculated and reused as a reactant in the fuel cell, wherein at the same time fresh hydrogen can be introduced into the anode recirculation channel and thus into the fuel cell, in order to keep the operation process of the fuel cell ongoing.

In another preferred embodiment the fuel cell system comprises a cooling system for cooling the fuel cell. Preferably, the fuel cell system also comprises a power electronics device for converting the electrical power from the fuel cell into an aircraft compatible current and voltage, which is also cooled by the cooling system. The cooling system comprises a coolant heat exchanger and a coolant recirculation channel for passing a coolant fluid between the fuel cell and the power electronics device on the one hand and the coolant heat exchanger on the other hand. The coolant heat exchanger extends through the ram air channel in order to cool the coolant fluid by the ram air. In such a manner the ram air flowing through the ram air channel can be used not only to cool the cathode product fluid and the compressed air in the cooler device, but also for cooling the coolant in the cooling system and therefore receiving the heat of the fuel cell and the power electronics device.

A further aspect of the present invention relates to a fire fighting system, preferably a fire suppression system, for an aircraft. The fire fighting system comprises a fire fighting section and a fuel cell system according to any of the embodiments described before. The fire fighting section comprises a media receiving device for keeping or passing a fire suppression media. The media receiving device can be formed as a container for keeping the fire suppression media, or as a channel for passing the fire suppression media to a respective application area. The cathode recirculation channel comprises an oxygen depleted air outlet for discharging oxygen depleted air from the fuel cell system. The media receiving device is connected to the oxygen depleted air outlet so as to receive oxygen depleted air from the cathode recirculation channel for use as a fire suppression media. By such a fire fighting system the fuel cell system can be used for both providing electrical power in the case of an emergency of the respective aircraft, and for supplying oxidant depleted air as a fire suppression media to the fire fighting section.

Another aspect of the present invention relates to an aircraft comprising a fuel cell system according to any of the afore-described embodiments or to a fire fighting system as described before. The aircraft within the meaning of the present invention might also be a helicopter or another airborne vehicle.

BRIEF DESCRIPTION OF THE DRAWINGS

In the following an embodiment of the fuel cell system according to the present invention is described in more detail by means of a drawing. The drawing shows in FIGURE a schematic illustration of an embodiment of the fuel cell system.

DETAILED DESCRIPTION

In the FIGURE a fuel cell system 1 for an aircraft according to an embodiment of the present invention is illustrated. The fuel cell system 1 comprises a fuel cell 3 out of a stack of fuel cells 3, a cathode recirculation channel 5, an anode recirculation channel 7, an oxidant supply channel 9, a fuel supply channel 11, a ram air channel 13, a power electronics device 15, a control unit 17, and a cooling system 19.

The fuel cell 3 has a cathode side 21 and an anode side 23. At the cathode side 21 a cathode inlet 25 and a cathode outlet 27 is provided. The cathode inlet 25 is configured for supplying an oxidant fluid 29 to the fuel cell 3. The cathode outlet 27 is configured for discharging a cathode product fluid 31 from the fuel cell 3. At the anode side 23 an anode inlet 33 and an anode outlet 35 is provided. The anode inlet 33 is configured for supplying a fuel fluid 37 to the fuel cell 3. The anode outlet 35 is configured for discharging an anode product fluid 39 from the fuel cell 3.

The cathode recirculation channel 5 connects the cathode outlet 27 to the cathode inlet 25 for passing the cathode product fluid 31 from the cathode outlet 27 to the cathode inlet 25. The anode recirculation channel 7 connects the anode outlet 35 to the anode inlet 33 for passing the anode product fluid 39 from the anode outlet 35 to the anode inlet 33.

The ram air channel 13 can be arranged at the belly fairing of the fuselage of an aircraft provided with the fuel cell system 1 according to the invention, and is configured to receive a flow of ram air 41 from the ambience during flight of the respective aircraft.

The power electronics device 15 is connected to the fuel cell 3 and configured for converting the electrical power generated by the fuel cell 3 into an aircraft compatible current and voltage. The power electronics device 15 comprises electric connectors 43 for connecting the power electronics device 15 to an aircraft electrical grid.

The cooling system 19 is configured for cooling the fuel cell 3 and the power electronics device 15. The cooling system 19 comprises a coolant recirculation channel 45 and a coolant heat exchanger 47. The coolant recirculation channel 45 connects the fuel cell 3 and the power electronics device 15 to the coolant heat exchanger 47 and is adapted for passing a coolant fluid 49 between the fuel cell 3 and the power electronics device 15 on the one hand, and the coolant heat exchanger 47 on the other hand. The coolant heat exchanger 47 is arranged in the ram air channel 13 for cooling the coolant fluid 49 by the ram air 41 flowing through the ram air channel 13. The coolant recirculation channel 45 further comprises a coolant reservoir 51, a coolant pump 53, and a plurality of coolant valves 55 for controlling the flow of coolant fluid 49 through the fuel cell 3 and the power electronics device 15.

Both the anode recirculation channel 7 and the cathode recirculation channel 5 are connected to a purge channel 57 which has a purge outlet 59 in the ram air channel 13 for discharging purge fluid 61 from the anode and cathode recirculation channels 7, 5.

The anode recirculation channel 7 is connected to the fuel supply channel 11 which in turn is connected to a hydrogen reservoir 63 storing hydrogen 65 in order to supply fuel fluid 37 in the form of hydrogen 65 to the anode recirculation channel 7 and thus to the fuel cell 3. The hydrogen reservoir 63 in the present embodiment is formed as a hydrogen bottle storing compressed, pure hydrogen 65.

The cathode recirculation channel 5 is connected to the oxidant supply channel 9 for introducing oxidant fluid 29 into the cathode recirculation channel 5. The oxidant supply channel 9 is connected to an oxygen reservoir 67 storing oxygen 69. The oxygen reservoir 67 in the present embodiment is formed as an oxygen bottle storing compressed and pure oxygen 69. At the same time the oxidant supply channel 9 is connected to an air supply device 71 for supplying air 73 to the oxidant supply channel 9. The air supply device 71 comprises a compressor 75 for providing compressed air 73 to the oxidant supply channel 9. The compressor 75 in the present embodiment forms part of a jet engine of an associated aircraft, wherein the air supply device 71 further comprises a bleed air extraction device 77 for extracting the compressed air 73 from the compressor 75 in the form of bleed air. Alternatively, the air supply device 71 may also comprise a cabin air extraction device (not shown) for extracting compressed air 73 in the form of cabin air from the cabin compartment of an associated aircraft. Further, oxidant supply valves 79 are provided between the oxidant supply channel 9 on the one hand and the oxygen reservoir 67 and the air supply device 71, respectively, on the other hand. By the oxidant supply valves 79 oxidant supply can be selected between oxygen 69 from the oxygen reservoir 67 and air 73 from the air supply device 71.

In order for the bleed air extraction device 77 to be able to extract compressed air 73 from the compressor 75 in a continuous manner, i.e. without stopping operation, the oxidant supply valve 79 near the compressor is formed as a three-way valve 80 further connected to a bleed air relief channel 82 for relieving compressed air 73 from the compressor 75 into the ram air channel 13 when no compressed air 73 is required by the oxidant supply channel 9, i.e. by the fuel cell 3, at the moment.

The cathode recirculation channel 5 comprises a cooling section 81 which extends through the ram air channel 13. The cooling section 81 comprises a cooler device 83 for cooling the cathode product fluid 31 in the cathode recirculation channel 5 by the ram air 41 streaming through the ram air channel 13. The cooling section 81 further comprises a water extraction device 85 for extracting water 87 from the cooled cathode product fluid 31. The water extraction device 85 is arranged between the cooler device 83 and the fuel cell 3 inside the ram air channel 13, and comprises a water drainage 89 with a drainage opening 91 in the ram air channel 13.

Additionally, the cooler device 83 is formed as a 3-way heat exchanger and the oxidant supply channel 9 extends through the cooler device 83 in such a manner that heat can be exchanged between the oxidant fluid 29 in the oxidant supply channel 9, the cathode product fluid 31 in the cathode recirculation channel 5, and the ram air 41 in the ram air channel 13.

The control unit 17 is configured to control the fuel cell system 1 for operation in a first operational mode and in a second operational mode. In the first operational mode oxidant fluid 29 is supplied to the cathode recirculation channel 5 in the form of oxygen 69 by the oxygen reservoir 67. Said oxygen 69 from the oxygen reservoir 67 is passed through the cooler device 83 in order to cool the cathode product fluid 31 in the cathode recirculation device 5. In the second operational mode oxidant fluid 29 is supplied to the cathode recirculation channel 5 in the form of air 73 by the air supply device 71. Said air 73 from the air supply device 71 is passed through the cooler device 83 in order to be cooled by the ram air 41 in the ram air channel 13 before it is introduced into the cathode recirculation channel 5. At the same time the cathode product fluid 31 in the cathode recirculation channel 5 flowing through the cooler device 83 is cooled by the ram air 41 in the ram air channel 13. Additionally, in the cooler device 83 heat exchange between the air 73 from the air supply device 71 and the cathode product fluid 31 in the cathode recirculation channel 5 is enabled.

The cathode recirculation channel 5 comprises an oxygen depleted air outlet 93 for discharging oxygen depleted air 95 from the cathode recirculation channel 5 and thus from the fuel cell system 1. The oxygen depleted air outlet 93 is configured to be connected to a media receiving device (not shown) of a fire fighting system for an aircraft. The media receiving device can be a container or a channel for keeping or passing a fire suppression media inside the fire fighting system.

By the fuel cell system 1 according to the present invention the water content of the cathode product fluid 31 can be reduced or at least stabilized by means of the cooler device 83 and the water extraction device 85 arranged in the ram air channel 13 and connected to the oxygen reservoir 67, so that in addition to the generation of electrical power by the fuel cell 3 oxygen depleted air 95 as a fire suppression media can effectively be provided to a fire fighting system of an aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel cell system for an aircraft comprising:
   a fuel cell having a cathode side and an anode side, wherein the cathode side includes a cathode inlet for supplying an oxidant fluid to the fuel cell and a cathode outlet for discharging a cathode product fluid from the fuel cell, and wherein the anode side includes an anode inlet for supplying a fuel fluid to the fuel cell and an anode outlet for discharging an anode product fluid from the fuel cell; and
   a cathode recirculation channel connecting the cathode outlet to the cathode inlet for passing the cathode product fluid from the cathode outlet to the cathode inlet,
   wherein the cathode recirculation channel comprises a water extraction device for extracting water from the cathode product fluid,
   wherein an oxidant supply channel is connected to the cathode recirculation channel for introducing oxidant fluid into the cathode recirculation channel, and
   wherein the oxidant supply channel is connected to an oxygen reservoir storing oxygen,
   wherein the cathode recirculation channel comprises a cooling section,
   wherein the cooling section comprises a cooler device for cooling the cathode product fluid in the cathode recirculation channel,
   wherein the water extraction device is provided in the cooling section downstream from the cooler device, and
   wherein the oxidant supply channel extends through the cooler device, so that heat exchange between the oxidant fluid in the oxidant supply channel, and the cathode product fluid in the cathode recirculation channel is facilitated, wherein the cathode product fluid is cooled by exchanging heat between the cold, expanded oxygen released from the oxygen reservoir and the warmer cathode product fluid.

2. A fuel cell system according to claim 1, wherein the fuel cell system comprises a ram air channel for receiving a flow of ram air from the ambience,
- wherein the cooling section extends through the ram air channel, and
- wherein the cooler device is formed as an air cooler device for cooling the cathode product fluid in the cathode recirculation channel by the ram air streaming through the ram air channel.

3. A fuel cell system according to claim 1, wherein the oxidant supply channel is connected to an air supply device for supplying air to the oxidant supply channel.

4. A fuel cell system according to claim 3, wherein the air supply device comprises a compressor for providing compressed air to the oxidant supply channel,
- wherein the air supply device comprises a jet engine including the compressor, and a bleed air extraction device for extracting the compressed air in the form of bleed air from the compressor.

5. A fuel cell system according to claim 3, wherein the air supply device comprises a cabin air extraction device for extracting compressed air in the form of cabin air from the cabin compartment.

6. A fuel cell system according to claim 3, further comprising at least one oxidant supply valve for selecting oxidant supply either from the oxygen reservoir or from the air supply device.

7. A fuel cell system according to claim 2, wherein the cooler device is formed as a 3-way heat exchanger, facilitating heat exchange between the oxidant fluid in the oxidant supply channel, the cathode product fluid in the cathode recirculation channel, and the ram air in the ram air channel.

8. A fuel cell system according to claim 7,
- wherein the oxidant supply channel is connected to an air supply device for supplying air to the oxidant supply channel, and
- wherein the fuel cell system further comprises a control unit configured to operate the fuel cell system in:
  - a first operational mode, wherein oxidant fluid is supplied to the cathode recirculation channel in the form of oxygen by the oxygen reservoir, and wherein said oxygen from the oxygen reservoir is passed through the cooler device to cool the cathode product fluid in the cathode recirculation channel, and
  - a second operational mode, wherein oxidant fluid is supplied to the cathode recirculation channel in the form of air by the air supply device, and wherein said air from the air supply device is passed through the cooler device to be cooled by the ram air in the ram air channel and the cathode product fluid in the cathode recirculation channel, said cathode product fluid in turn being cooled by the ram air in the ram air channel.

9. A fuel cell system according to claim 1, wherein the fuel cell system comprises a cooling system for cooling the fuel cell,
- wherein the cooling system comprises a coolant heat exchanger and a coolant recirculation channel for passing a coolant fluid between the fuel cell and the coolant heat exchanger, and
- wherein the coolant heat exchanger extends through the ram air channel to cool the coolant fluid by the ram air.

10. A fire fighting system for an aircraft, comprising a fire fighting section and a fuel cell system according to claim 1,
- wherein the fire fighting section comprises a media receiving device for keeping or passing a fire suppression media,
- wherein the cathode recirculation channel comprises an oxygen depleted air outlet for discharging oxygen depleted air from the fuel cell system, and
- wherein the media receiving device is connected to the oxygen depleted air outlet so as to receive oxygen depleted air from the cathode recirculation channel for use as a fire suppression media.

11. An aircraft comprising a fuel cell system according to claim 1.

* * * * *